United States Patent Office 3,546,297
Patented Dec. 8, 1970

3,546,297
PROCESS FOR PREPARATION OF AROMATIC CHLOROAMINES
John Richard Kosak, Wilmington, Del., assignor to E. I. du Pont de Nemours and Company, Wilmington, Del., a corporation of Delaware
No Drawing. Continuation-in-part of application Ser. No. 612,796, Jan. 31, 1967. This application July 1, 1969, Ser. No. 838,357
Int. Cl. C07c 85/10
U.S. Cl. 260—580          8 Claims

ABSTRACT OF THE DISCLOSURE

The present invention relates to a process for the preparation of chloro-substituted anilines by the catalytic reduction of nitro monocarbocyclic aromatic hydrocarbons having one or two chlorine atoms in the presence of a platinum catalyst, a nitrogen base and an effective amount of divalent nickel and trivalent chromium, the nickel and chromium being optionally deposited on the catalyst. When the nitrogen base compound is ammonia, the nickel and chromium may be omitted.

CROSS-REFERENCE TO RELATED APPLICATION

This application is a continuation-in-part of my application Ser. No. 612,796, filed Jan. 31, 1967, titled Process for the Preparation of Aromatic Chloroamines, now abandoned.

BACKGROUND OF INVENTION

This invention is an improvement in the process described by J. R. Kosak in U.S. Pat. No. 3,145,231. The Kosak process prepares chloroanilines by hydrogenating chloronitrobenzenes at 30° C. to 150° C. and about 200–600 p.s.i.g. hydrogen pressure in the presence of platinum catalyst and a cycloaliphatic nitrogen base as dechlorination inhibitor.

It has been recognized in the art, as shown in U.S. Pat. No. 3,253,039, that heavy metals, such as nickel and chromium, either poison or have little effect on a platinum hydrogenation catalyst. In addition, U.S. Pat. No. 3,145,231 shows that nickel catalyst was found to cause excessive dechlorination.

It has now been discovered that when both nickel and chromium ions are present in the hydrogenation process described by Kosak in U.S. Pat. 3,145,231, the rate of hydrogenation is increased without attendant increase in dechlorination, the amount of catalyst required to accomplish complete reduction of an equivalent quantity of nitro compound is decreased and the platinum catalyst has a longer life.

In U.S. Pat. No. 3,145,231, Kosak describes the use of certain cycloaliphatic bases as dehalogenation suppressors. Bases of the same series of compounds, with the restriction that the nitrogen atom or atoms have at least one hydrogen atom attached thereto, are used in he present invention.

E. B. Maxted and M. S. Biggs in Journal of the Chemistry Society, 1957, page 3844, discuss the poisoning of a platinum catalyst by dry ammonia, as well as some amines, in the hydrogenation of unsaturated hydrocarbons. However, the article continues, stating that water and acidic media modify the toxicity of these compounds toward the catalyst. It has now been unexpectedly discovered that ammonia serves as an effective dechlorination suppressor in the process of the present invention, showing an enhanced effect in combination with nickel and chromium ions.

SUMMARY OF THE INVENTION

In the process of the present invention a reaction vessel is charged with a chloro-substituted aromatic nitro compound, platinum catalyst, a dechlorination suppressor such as ammonia or one or more secondary cycloaliphatic amines and an effective quantity of divalent nickel and trivalent chromium ions which may optionally be deposited on the catalyst. Hydrogen gas is passed into the system as the reactants are agitated and heated. When the reaction is completed the corresponding chloro-substituted aromatic amine is recovered and purified.

DESCRIPTION OF THE INVENTION

The process of this invention is applicable to the conversion of chloro-substituted aromatic nitro compounds to the corresponding chloro-substituted aromatic amines without substantial loss of chlorine. It is particularly applicable to such conversion of the commercially important chloro-substituted nitrobenzene and nitroalkylbenzenes containing up to 10 carbon atoms and two chlorine atoms. Typical of the preferred nitro compounds are p-nitrochlorobenzene;
o-nitrochlorobenzene,
m-nitrochlorobenzene;
2-chloro-4-nitrotoluene,
4-chloro-2-nitrotoluene;
3-chloro-4-nitroethylbenzene;
2,4-dichloronitrobenzene;
3,4-dichloronitrobenzene;
3,5-dichloronitrobenzene;
4-chloro-6-nitro meta-xylene;
3-chloro-4-nitro-propylbenzene; and
3-chloro-4-nitrobutyl benzene.

(a) *Nickel and chromium ions added separately.*—The platinum catalyst may consist essentially of the metal itself or the metal may be disposed on an inert support such as a carbon black or diatomaceous earth. The free metal is conveniently employed in the form of platinum oxide, e.g. Adams catalyst, which under the conditions of the hydrogenation is reduced to the finely divided active metal. Preferably, the catalyst will consist essentially of platinum supported on carbon. Supported catalysts may be prepared by any of the methods known to the art such as (a) impregnating the support with a platinum metal salt solution by evaporating a solution of the platinum salt in the presence of the support or (b) precipitating platinum hydroxide in the presence of the support by adding a platinum chloride solution to a hot alkaline solution in which the support is suspended. A preferred procedure involves adding an aqueous solution of platinum chloride to a solution of bicarbonate in water containing suspended carbon, then heating to precipitate platinum hydroxide, and filtering off the catalyst, as exemplified in U.S. Pat. No. 2,823,235 and U.S. Pat. No. 3,265,636.

The carbon support for platinum may be any porous or non-porous amorphous material. Oleophilic carbons have the advantage of giving increased reduction rates as described in U.S. Pat. No. 2,823,235. Such highly oleophilic carbons are known in the trade as Shawinigan Acetylene Black or conductive furnace blacks. However, other carbons may be used, for example, furnace blacks, or commercial activated carbons of vegetable or animal origin.

Normally, the concentration of platinum metal on the support will be between 0.5% and 5%, preferably about 1% by weight. A concentrated catalyst with about 5 to 10% platinum may be prepared and subsequently diluted for use as described in U.S. Pat. No. 2,823,235 and in U.S. Pat. No. 3,265,636. The ratio of nitro body to platinum is ordinarily maintained above 10,000:1 and below about 250,000:1. Sufficient catalyst should be used to give practical rates of reduction. Preferred ratios are in the range 50,000 to 200,000:1.

Unexpectedly, the dechlorination suppressor in the present invention may be ammonia. Alternatively it may be one or more of the known suppressors, that is, a cycloaliphatic amine, such as morpholine, piperazine, N-methyl piperazine or N-ethyl piperazine as disclosed in U.S. Pat. No. 3,145,231. The quantity of the ammonia or cycloaliphatic amine component will vary depending primarily on the particular nitro body to be hydrogenated and the effect desired. In general, enough of this material is employed to suppress dehalogenation and prevent the development of acidity during the hydrogenation. At mole ratios of nitrogen base to nitro body of less than 0.01:1 dehalogenation is not always suppressed to the desired extent; at higher ratios than 1.5:1 product quality may be adversely affected. Preferred ratios range from about 0.02 to about 1:1, particularly those below about 0.2:1 for reason of economy.

The divalent nickel and trivalent chromium ions are conveniently introduced into the system in the form of their oxides, hydroxides or salts. The use of a salt having an anion which poisons the catalyst is to be avoided, such as the sulfide. Thus, for example, the oxides, hydroxides, nitrates, sulfates, acetates and chlorides of divalent nickel and trivalent chromium may be used. They are added preferably in aqueous solution, although the solid compounds may also be used as such. The effective quantity of divalent nickel and trivalent chromium ions is in the range of 5 to 500 p.p.m. each based on the amount of nitro compound, preferably 5 to 50 p.p.m. However, when the dechlorination suppressor is ammonia, satisfactory results may be achieved without the aid of nickel and chromium as shown by the examples below.

(b) *Nickel and chromium ions added to catalyst.*—A preferred embodiment consists of depositing the divalent nickel and trivalent chromium ions as well as the platinum on a carbon support. This has the advantages of overcoming the previous problem of incomplete platinum precipitation on carbon supports and of simplifying the subject catalytic reduction process. More specifically, it has now been found that the addition of the above nickel and chromium salts directly to a chloroplatinic acid, sodium carbonate, carbon and water mixture (essentially as described in U.S. Pat. 2,823,235) causes all the platinum to precipitate from the solution as platinum dioxide together with nickel (II) hydroxide and chromium (III) hydroxide. The total metal loading on the carbon should be about 0.1 to 10.0% by weight.

In order to insure complete platinum precipitation on the carbon support, the weight ratio of platinum to nickel to chromium should be 1/0.125/0.125 to 1/0.5/0.5. Ratios outside this range, while not providing complete platinum precipitation, can still be used however to yield effective hydrogenation catalysts for the catalytic reduction of the chloro-substituted aromatic nitro compounds to the corresponding aromatic amines. These novel hydrogenation catalysts are to be understood to form part of the subject invention.

(c) *Catalytic hydrogenation process.*—The process of this invention may be performed either batchwise or continuously in conventional equipment. A reaction vessel is charged with the nitro compound, the catalyst, the nitrogen base dechlorination suppressor and the nickel and chromium if added separately rather than on the catalyst. Hydrogen gas is passed into the system under superatmospheric pressure as the reactants are vigorously agitated and heated. The reaction is judged complete when analysis for nitro compound shows less than 0.2% unreduced material present. The reduction mass is filtered to recover the catalyst, the amine product is separated from the water produced by the reaction and then dried. The amine product may be further purified by distillation if an extremely high quality product is desired.

The temperature and pressures of hydrogenation may vary widely as herein described. Preferred operating temperatures are in the range of from 50° to 120° C. Temperatures below about 30° C. and above about 150° C. are considered impractical. Preferably, operating temperatures are chosen such that the reaction mass is fluid during the reduction and will vary with the particular nitro compound being hydrogenated, the amount of nitrogen base present and the choice of solvent if one is used.

Hydrogen pressures of from about 200 to 600 p.s.i.g. are preferred. Satisfactory results are not always attained at pressures below about 100 p.s.i.g., while pressures above about 700 p.s.i.g. are normally unnecessary.

A solvent is not ordinarily required, although, if desired, solvents may be used, such as water, lower alkanols (methanol, ethanol, propanol, butanol) and water-miscible ethers (tetrahydrofuran and dioxane).

The following examples are representative examples illustrating the present invention. All parts are by weight unless otherwise specified.

EXAMPLE 1

A stainless steel autoclave equipped with a jacket for heating, coils for circulating temperature controlled water, and an efficient agitator is charged with: 400 parts of 1-nitro-3,4-dichlorobenzene; 2 parts of morpholine; 0.002 part of platinum as a catalyst paste consisting of platinum hydroxide deposited on Shawinigan Black, the quantity of platinum being 1% weight of the wet (water) paste and 5% weight on a dry basis; and 0.0125 part $Ni(NO_3)_2$ and 0.0121 part $CrCl_3$ to give 10 p.p.m. each of divalent Ni and trivalent Cr based on the nitro compound. The quantity of morpholine employed corresponds to 0.011 mole per mole of nitro compound while that of the catalyst corresponds to about 1 part of platinum for 200,000 parts of nitro component.

Air in the autoclave and lines is displaced by pressurizing with nitrogen and releasing the pressure through a vent system. The nitrogen is then displaced with hydrogen by successive pressurizings to 350 p.s.i.g. and venting to zero. The temperature of the mixture is then raised to 95±5° C., the agitator started, and the hydrogen pressure increased to 450 p.s.i.g. Absorption of hydrogen is rapid with evolution of heat; the temperature is held at 95±5° C. by circulating temperature controlled water through the cooling coils. The autoclave is repressured with hydrogen to 450 p.s.i.g. after each 100 lb. drop in pressure. The total hydrogenation time is 89 minutes. When no further hydrogen absorption occurs, the mass is held 30 minutes longer at 95° C. and 450 p.s.i.g. pressure.

The hot reduction mass is then filtered, the filtrate allowed to settle at 70 to 85° C., and the layers separated. The dichloroaniline layer is dehydrated by heating at 100±10° C. at 20 mm. of Hg pressure to yield substantially pure 3,4-dichloroaniline (98.7%), having a freezing point of 70.7° C. If desired, the 3,4-dichloroaniline product can be distilled under reduced pressure in the presence of 2% weight soda ash and 0.25% weight tetraethylenepentamine, as described by Franklin and McCarthy in U.S. Pat. No. 2,911,340, to obtain 3,4-dichloroaniline to give an over-all yield of 96%.

The percent dechlorination, as determined by vapor phase chromatography of the crude amine was 0.08.

Using the procedure of the example above, a series of reactions were completed using 400 parts of 1-nitro-3,4-dichlorobenzene, $NiCl_2$ and $CrCl_3$ as the metal salts and morpholine as the dehalogenation suppressor. The results are presented in the following table.

TABLE I

| Parts suppressor | Parts pt. catalyst | $NiCl_2$, p.p.m. | $CrCl_3$, p.p.m. | Reduction time, min. | Percent dechlorination |
|---|---|---|---|---|---|
| (a) 4 | 0.004 | None | None | 84 | 0.23 |
| (b) 2 | 0.004 | None | None | 84 | 0.25 |
| (c) 2 | 0.004 | 5 | 5 | 62 | 0.17 |
| (d) 2 | 0.002 | None | None | 232 | 0.14 |
| (e) 2 | 0.002 | 5 | 5 | 116 | 0.14 |
| (f) 2 | 0.002 | 10 | 10 | 116 | 0.15 |
| (g) 2 | 0.002 | 25 | 25 | 118 | 0.22 |
| (h) 4 | 0.002 | None | None | 93 | 0.19 |
| (i) 4 | 0.002 | 100 | 100 | 65 | 0.56 |
| (j) 4 | 0.002 | 370 | 370 | 70 | 0.41 |
| (k) 4 | 0.002 | 10 | 10 | 80 | 0.20 |
| (l) 4 | 0.002 | 50 | 10 | 72 | 0.36 |
| (m) 4 | 0.002 | 10 | 50 | 66 | 0.21 |
| (n) 4 | 0.002 | 50 | 50 | 72 | 0.20 |
| (o) 4 | 0.004 | None | None | 76 | 0.13 |
| (p) 4 | 0.004 | 10 | None | 68 | 0.28 |
| (q) 4 | 0.004 | None | 10 | 77 | 0.17 |

In Table 1 (a) and (b) show the effect of lowering the amount of dehalogenation supressor present during the reaction; (c) shows the increase in the rate of reduction and the decrease in dehalogenation when divalent nickel and trivalent chromium are present; (d) shows the effect of using a lesser amount of platinum catalyst; (e), (f) and (g) show the effect of various amounts of nickel and chromium ion being present; (h), (i) and (j) show that there is an upper limit as to the amount of nickel and chromium ions which should be present; (k), (l), (m) and (n) in comparison with (h) show that when an increased amount of nickel ions are present there is an increase in the percent dechlorination; (o), (p) and (q) show that the presence of either nickel or chromium ions alone is not effective.

Using the same procedure, except that $Ni(NO_3)_2$ was substituted for $NiCl_2$, produced the following results which show that $Ni(NO_3)_2$ is effective.

TABLE II

| Parts suppressor | Parts pt. catalyst | $Ni(NO_3)_2$, p.p.m. | $CrCl_3$, p.p.m. | Reduction time, min. | Percent dechlorination |
|---|---|---|---|---|---|
| 2 | 0.002 | None | None | 111 | 0.11 |
| 2 | 0.002 | 10 | 10 | 89 | 0.08 |

The process of the example was practiced using 400 parts of o-nitrochlorobenzene, morpholine, $NiCl_2$, and $CrCl_3$ with the following successful results.

TABLE III

| Parts suppressor | Parts pt. catalyst | $NiCl_2$, p.p.m. | $CrCl_3$, p.p.m. | Reduction time, min. |
|---|---|---|---|---|
| 4 | 0.004 | None | None | 260 |
| 4 | 0.004 | 10 | 10 | 200 |

When 400 parts of p-nitrochlorobenzene were used the results were:

TABLE IV

| Parts suppressor | Parts pt. catalyst | $NiCl_2$, p.p.m. | $CrCl_3$, p.p.m. | Reduction time, min. | Percent dechlorination |
|---|---|---|---|---|---|
| 8 | 0.003 | None | None | 134 | 0.91 |
| 8 | 0.003 | 10 | 10 | 96 | 0.71 |

Once again using 400 parts of 1-nitro-3,4-dichlorobenzene and $NiCl_2$ and $CrCl_3$, piperazine was used as the dehalogenation suppressor with the following results.

TABLE V

| Parts suppressor | Parts pt. catalyst | $NiCl_2$, p.p.m. | $CrCl_3$, p.p.m. | Reduction time, min. | Percent dechlorination |
|---|---|---|---|---|---|
| 4 | 0.002 | None | None | 229 | 0.04 |
| 4 | 0.002 | 10 | 10 | 143 | 0.10 |

The following table shows the use of magnesium oxide and ammonia as dehalogenation suppressors with 400 parts of 1-nitro-3,4-dichlorobenzene and $NiCl_2$ and $CrCl_3$.

TABLE VI

| Suppressor | Parts suppressor | Parts Pt. catalyst | $NiCl_2$, p.p.m. | $CrCl_3$, p.p.m. | Reduction time, min. | Percent dechlorination |
|---|---|---|---|---|---|---|
| MgO | 1 | 0.004 | None | None | 70 | 1.02 |
| MgO | 1 | 0.004 | 10 | 10 | 110 | 0.71 |
| Ammonia | 4 | 0.004 | None | None | 188 | 0.03 |
| Do | 4 | 0.004 | 10 | 10 | 112 | 0.04 |
| Do | 4 | 0.004 | 25 | 25 | 88 | 0.06 |
| Do | 4 | 0.004 | 50 | 50 | 113 | 0.13 |
| Do | 1 | 0.004 | 10 | 10 | 84 | 0.15 |

It has been discovered, as disclosed in Table VI at line 3, that ammonia is an effective dehalogenation suppressor when used alone in the absence of nickel and chromium ions. The use of ammonia as a dehalogenation suppressor is shown in the following example.

EXAMPLE 2

A stainless steel autoclave equipped with a jacket for heating, coils for circulating temperature controlled water, and an efficient agitator is charged with: 400 parts of 1-nitro-3,4-dichlorobenzene, 4 parts of ammonia added as 28% aqueous ammonium hydroxide, 0.004 part of platinum as a catalyst paste consisting of platinum hydroxide deposited on Shawinigan Black, the quantity of platinum being 1% weight of the wet (water) paste and 5% weight on a dry basis. The quantity of ammonia corresponds to 0.11 mole per mole of nitro compound, and that of the catalyst corresponds to 1 part of platinum to 100,000 parts of the nitro compound.

Air in the autoclave and lines is displaced by pressurizing with nitrogen and releasing the pressure through a vent system. The nitrogen is then displaced with hydrogen by successive pressurizings to 350 p.s.i.g. and venting to zero. The temperature of the mixture is then raised to 95±5° C., the agitator started, and the hydrogen pressure increased to 500 p.s.i.g. Absorption of hydrogen is rapid with evolution of heat; the temperature is held at 95±5° C. by circulating temperature controlled water through the cooling coils. The autoclave is repressured with hydrogen to 500 p.s.i.g. after each 100 lbs. drop in pressure. The total hydrogenation time is 188 minutes. When no further hydrogen absorption occurs, the mass is held 30 minutes longer at 95° C. and 500 p.s.i.g. pressure.

The hot reduction mass is then filtered, the filtrate allowed to settle at 70 to 85° C. and the layers separated. The 3,4-dichloroaniline layer is dehydrated by heating at 100±10° C. at 20 mm. of Hg pressure and then distilled under reduced pressure in the presence of 2% weight soda ash and 0.25% weight tetraethylenepentamine, as described by Franklin and McCarthy in U.S. Pat. No. 2,911,340, to yield substantially pure 3,4-dichloroaniline having a freezing point of 71° C.

The percent dechlorination, as determined by vapor phase chromatography of the crude amine, was 0.03.

K and L demonstrate that the platinum may be prereduced if desired.

TABLE VII

| Run | Nickel NiCl₂·6H₂O | Nickel Ni | Chromium CrCl₃·6H₂O | Chromium Cr | Pt-Ni-Cr weight ratio | Pt in filtrate | Na₂CO₃ | Time to reduce, minutes | Percent dechlorination |
|---|---|---|---|---|---|---|---|---|---|
| A | 0.81 | 0.20 | 1.025 | 0.20 | 1/0.5/0.5 | No | 2.4 | 80 | .11 |
| B | 0.162 | 0.04 | 0.205 | 0.04 | 1/0.1/0.1 | Trace | 1.44 | 99 | .18 |
| C | 0.081 | 0.02 | 0.1025 | 0.02 | 1/.05/.05 | Yes | 1.32 | 87 | .26 |
| D | 0.81 | 0.20 | 1.025 | 0.20 | 1/0.5/0.5 | No | 2.40 | 80 | .12 |
| E | 0.81 | 0.20 | 1.025 | 0.20 | 1/0.5/0.5 | No | 2.58 | 76 | .14 |
| F | 0.81 | 0.20 | 1.025 | 0.20 | 1/0.5/0.5 | No | 2.22 | 69 | .13 |
| G | 0.81 | 0.20 | 1.025 | 0.20 | 1/0.5/0.5 | No | 2.4 | 63 | .21 |
| H | 0.81 | 0.20 | 1.025 | 0.20 | 1/0.5/0.5 | No | ⁴ 1.2 | 69 | .27 |
| I | 0.81 | 0.20 | 1.025 | 0.20 | 1/0.5/0.5 | No | ⁵ 1.2 | 71 | .26 |
| J | 0.81 | 0.20 | 1.025 | 0.20 | ¹ 1/0.5/0.5 | No | 2.4 | 78 | .12 |
| K | 0.81 | 0.20 | 1.025 | 0.20 | ² 1/0.5/0.5 | No | 2.4 | 66 | .18 |
| L | 0.81 | 0.20 | 1.025 | 0.20 | ³ 1/0.5/0.5 | No | 2.4 | 70 | .09 |
| M | 0.405 | 0.10 | 0.512 | 0.10 | 1/0.25/0.25 | No | 1.8 | 57 | .19 |
| N | 0.202 | 0.05 | 0.26 | 0.05 | 1/0.125/0.125 | No | 1.5 | 67 | .17 |

¹ Platinum prereduced with CH₂O.
² Platinum prereduced with N₂H₄.
³ Platinum prereduced with NaBH₄.
⁴ Plus 1.8 parts morpholine.
⁵ Plus 0.7 part aqueous ammonia.

The following example demonstrates the procedure for preparing novel dehydrogenation catalysts having the nickel and chromium ions deposited thereon.

EXAMPLE 3

Two reaction masses, A and B, are prepared by charging 227 ml. of distilled water, 8 grams of acetylene carbon black (Shawinigan Black) and 1.2 grams of sodium carbonate (Na₂CO₃) into a flask and heating to 99° C. To each reaction mass is then added 1.0033 grams of H₂PtCl₆ solution (approximately 0.4 gram of platinum) and the mass held for 3 hours at 98±2° C. Next is added, to mass B only, 1.20 grams of Na₂CO₃, 0.81 gram of NiCl₂-6H₂O (about 0.2 g. of divalent nickel) and 1.025 grams of CrCl₃-6H₂O (about 0.2 g. of trivalent chromium), and both masses held at 98±2° C. for 3 more hours. A sample of the catalyst slurry is taken, filtered to remove the catalyst, and the filtrate tested for platinum ion with the following results:

Control Mass A—some platinum ion present
Mass B—platinum ion absent

Thus the coprecipitation with nickel and chromium ions leads to complete deposition of the platinum on the support. The catalyst slurry is cooled to about 40° C. and filtered to isolate the catalyst.

The following example demonstrates the use of dehydrogenation catalyst prepared as in this example to reduce p-chloronitrobenzene.

EXAMPLE 4

400 parts of p-chloronitrobenzene, 4 parts of morpholine and 0.47 part catalyst (containing 0.004 part platinum, 0.002 part nickel and 0.002 part chromium) are charged into an Inconel autoclave and the mass hydrogenated at 95–100° C. and 400–500 p.s.i.g. hydrogen pressure following the procedure of Example 1. The reduction time to yield the chloroaniline is 94 minutes.

EXAMPLE 5

Following the procedures of Examples 3 and 4, hydrogenation catalysts having varying ratios of platinum, nickel and chromium deposited thereon are prepared using varying amounts of sodium carbonate and then used to reduce 3,4-dichloronitrobenzene. The results are tabulated in Table VII. In runs A through F the ratio of 3,4-dichloronitrobenzene to platinum is 400 parts: 0.004 part. In runs G through N the ratio is 400:0.003. All amounts in the table are parts by weight. 4 parts of morpholine are used in all reductions.

Runs A, B, C, M and N show the effect of varying the Pt/Ni/Cr ratio. Runs D, E and F show using varying amounts of Na₂CO₃. Runs G, H and I show the use of different bases in the catalyst preparation. Runs J, It is to be understood that the preceding examples are representative and the said examples may be varied within the scope of the total specification, as understood by one skilled in the art, to produce essentially the same results.

As many widely different embodiments of this invention may be made without departing from the spirit and scope thereof, it is to be understood that this invention is not limited to the specific embodiments thereof.

I claim:
1. A process for the preparation of halogen substituted aromatic amines by the catalytic hydrogenation of nitro monocarbocyclic aromatic hydrocarbons bearing 1 to 2 chlorine atoms, which process comprises effecting the reduction of said nitro compounds, at temperatures of from 30 to 150° C. and hydrogen gas pressures of at least about 100 p.s.i.g., in the presence of:
    (a) a platinum hydrogenation catalyst, in an amount providing one part of platinum for every 10,000 to 250,000 parts by weight of said nitro compound, and
    (b) a dechlorination suppressor selected from the group consisting of ammonia and a cycloaliphatic nitrogen base having the formula

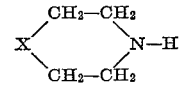

where X is a radical selected from the group consisting of oxygen and N—R, and R is selected from the group consisting of hydrogen, methyl, and ethyl radicals, the amount of said nitrogen base corresponding to 0.01 to 1.5 moles per mole of said nitro compound, and
    (c) divalent nickel and trivalent chromium ions in an amount in the range of from 5 to 500 p.p.m. each based upon the amount of said nitro compound.

2. A process according to claim 1, wherein the dechlorination suppressor is morpholine.

3. A process according to claim 1 wherein the dechlorination suppressor is piperazine.

4. A process according to claim 1 where the nitro monocarbocyclic aromatic hydrocarbon is 1-nitro-3,4-dichlorobenzene.

5. A process according to claim 1 wherein the platinum is in the form of its oxide or hydroxide on a carbon support.

6. A process according to claim 1 wherein the hydrogenation catalyst comprises a carbon black support having deposited thereon the platinum of (a) as its dioxide and the nickel and chromium ions of (c) as their hydroxide, the total metal loading being 0.1 to 10.0% by weight of the support.

7. A process according to claim 6 wherein the weight ratio of platinum/nickel/chromium is 1/(0.125 to 0.5)/(0.125 to 0.5).

8. A process for the preparation of halogen substituted aromatic amines by the catalytic hydrogenation of nitro monocarbocyclic aromatic hydrocarbon bearing 1 to 2 chlorine atoms, which process comprises effecting the reduction of said nitro compounds, at temperatures of from 30 to 150° C. and hydrogen gas pressures of at least about 100 p.s.i.g., in the presence of:
 (a) a platinum hydrogenation catalyst, in an amount providing one part of platinum for every 10,000 to 250,000 parts by weight of said nitro compound, and
 (b) ammonia in a quantity corresponding to 0.01 to 1.5 moles per mole of said nitro compound.

References Cited

UNITED STATES PATENTS

| | | | |
|---|---|---|---|
| 3,145,231 | 8/1964 | Kosak | 260—580 |
| 3,253,039 | 5/1966 | Rylander et al. | 260—580 |
| 3,350,452 | 10/1967 | Rylander et al. | 260—580 |

CHARLES B. PARKER, Primary Examiner

R. L. RAYMOND, Assistant Examiner

U.S. Cl. X.R.

252—470, 472; 260—570.8, 570.9